(12) United States Patent
Tracy et al.

(10) Patent No.: US 7,050,312 B2
(45) Date of Patent: May 23, 2006

(54) MULTI-MODE UNINTERRUPTIBLE POWER SUPPLIES AND METHODS OF OPERATION THEREOF

(75) Inventors: John G. Tracy, Raleigh, NC (US); Miguel E. Chavez, Raleigh, NC (US); Robert W. Johnson, Jr., Raleigh, NC (US); Rune Lennart Jonsson, Raleigh, NC (US)

(73) Assignee: Eaton Power Quality Corporation, Cleveland, OH (US)

( * ) Notice: Subject to any disclaimer, the term of this patent is extended or adjusted under 35 U.S.C. 154(b) by 49 days.

(21) Appl. No.: 10/796,647

(22) Filed: Mar. 9, 2004

(65) Prior Publication Data

US 2005/0201127 A1    Sep. 15, 2005

(51) Int. Cl.
*H02M 5/458* (2006.01)
(52) U.S. Cl. .............................. 363/37; 363/34; 307/66
(58) Field of Classification Search ................. 363/34, 363/37, 39, 17, 98, 132, 131, 127, 84, 89; 307/64–66, 45, 105, 46
See application file for complete search history.

(56) References Cited

U.S. PATENT DOCUMENTS

| | | | | |
|---|---|---|---|---|
| 5,126,585 | A | 6/1992 | Boys | ............................ 307/66 |
| 5,939,798 | A | 8/1999 | Miller | |
| 6,201,371 | B1 | 3/2001 | Kawabe et al. | |
| 6,295,215 | B1 | 9/2001 | Faria et al. | |
| 6,483,730 | B1 * | 11/2002 | Johnson, Jr. | ................. 363/123 |
| 6,605,879 | B1 * | 8/2003 | Wade et al. | ................... 307/66 |
| 6,906,933 | B1 * | 6/2005 | Taimela | ........................ 363/37 |

FOREIGN PATENT DOCUMENTS

| | | |
|---|---|---|
| EP | 1 261 097 A1 | 11/2002 |
| EP | 1 306 958 A2 | 5/2003 |
| FR | 2 685 830 | 7/1993 |

OTHER PUBLICATIONS

U.S. Appl. No. 10/286,027, Tamiela, filed Nov. 11, 2002, Now Patent # 6906933.
Notification of Transmittal of the International Search Report and the Written Opinion of the International Searching Authority, or the Declaration, PCT/US2005/006529, Jul. 1, 2005.

* cited by examiner

*Primary Examiner*—Rajnikant B. Patel
(74) *Attorney, Agent, or Firm*—Myers Bigel Sibley & Sajovec PA (57) ABSTRACT

An uninterruptible power supply apparatus includes a first bidirectional power converter circuit having first and second ports and a second bidirectional power converter circuit having first and second ports. The apparatus further includes a DC link that couples the second port of the first bidirectional power converter circuit to the first port of the second bidirectional power converter circuit. A first load port is coupled to the second port of the second bidirectional power converter circuit and a second load port is coupled to the first port of the first bidirectional power converter circuit. The apparatus further includes a control circuit that is configured to control the first and second bidirectional power converter circuits such that each of the first and second bidirectional power converter circuits can generate and/or condition AC power at each of the first and second load ports.

24 Claims, 13 Drawing Sheets

MULTI-MODE UNINTERRUPTIBLE POWER SUPPLIES AND METHODS OF OPERATION THEREOF

BACKGROUND OF THE INVENTION

The present invention relates to power conversion apparatus and methods, and more particularly, to uninterruptible power supply (UPS) apparatus and methods.

UPSs are commonly used to provide conditioned and/or auxiliary power to electronic equipment that provides critical functions, such as computer systems, telecommunications systems and medical equipment. Typically, UPSs can provide AC power from a backup source, such as a battery, generator or fuel cell, in the event that a utility power supply fails or becomes degraded.

Figure 1:
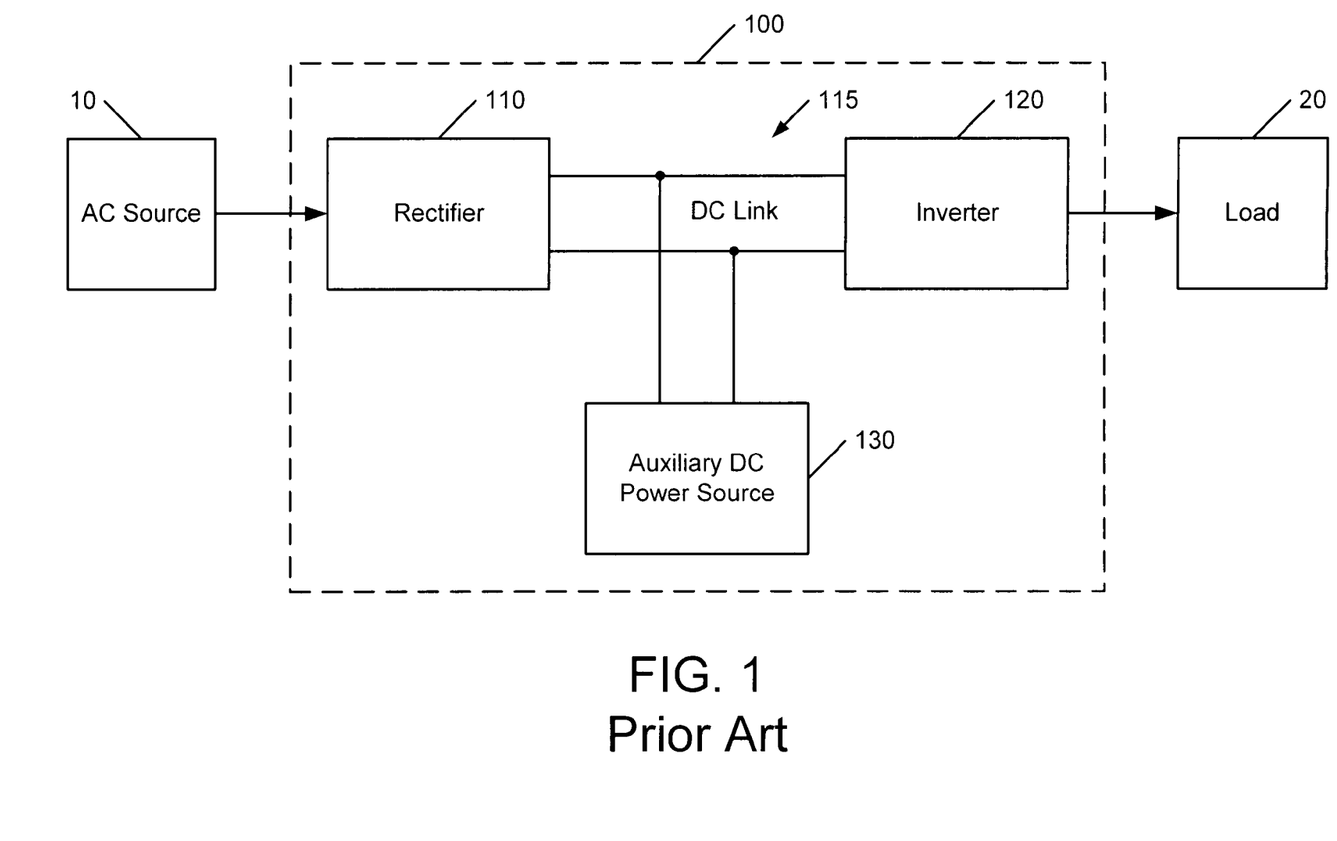
FIGS. 1 and 2 are schematic diagrams illustrating conventional UPS configurations.

Some UPS systems use an architecture in which an AC voltage is generated from a DC voltage on a DC link. As shown in FIG. 1, a typical conventional "double-conversion" UPS 100 includes a rectifier 110 that receives AC power from an AC power source 10, such as a utility grid. The rectifier 110 generates a DC voltage on a DC link 115. The UPS 100 further includes an inverter 120 that generates an AC output that is applied to a load 20 from the DC voltage on the DC link 115. Backup or supplemental power may be provided via the DC link 115 by an auxiliary DC power source 130, e.g., a battery.

Figure 2:
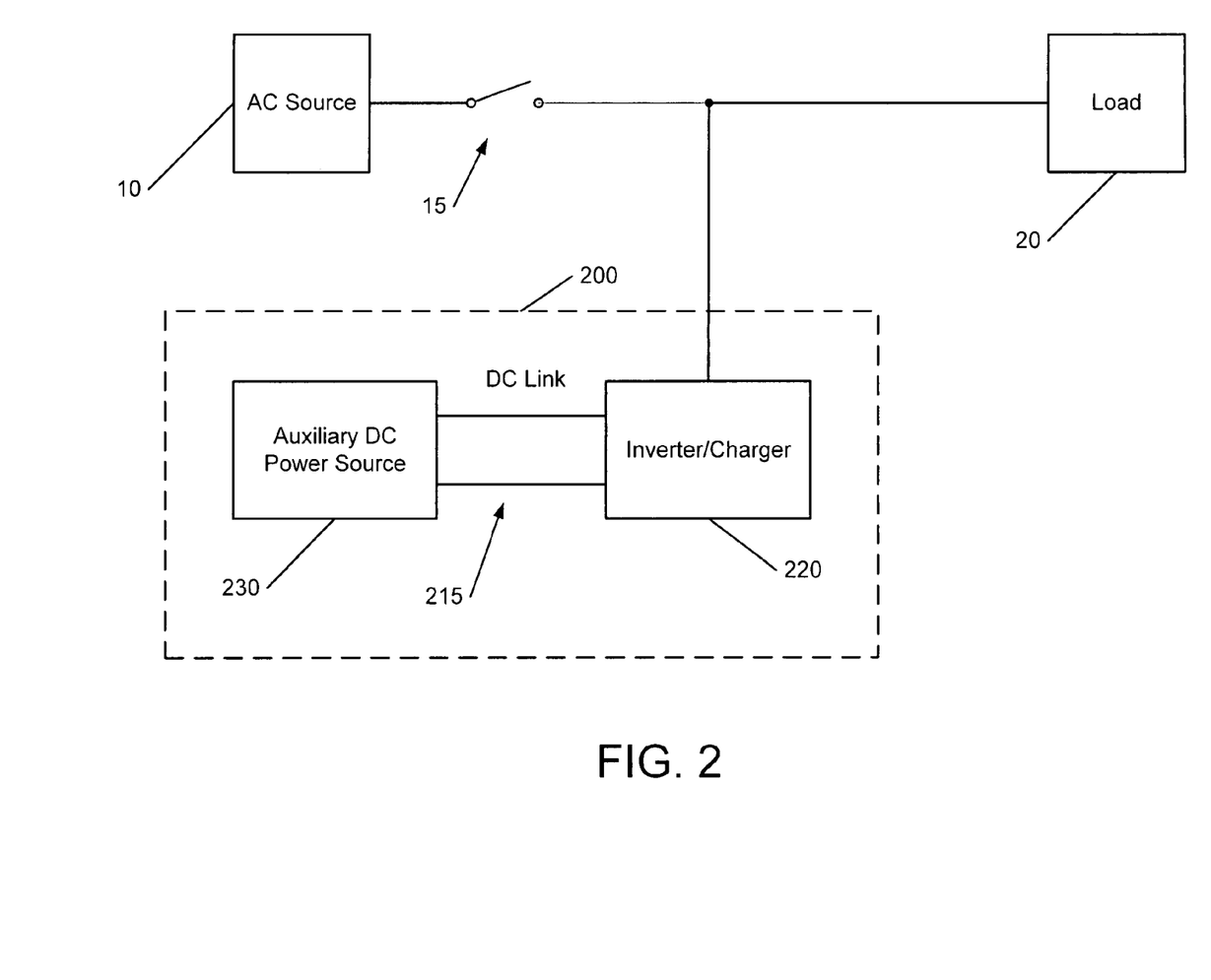

FIG. 2 illustrates a conventional "line interactive" UPS architecture. A line-interactive UPS 200 includes an inverter/charger circuit 220 that is configured to be coupled to an AC source 10 (via a switch 15) and to a load 20. The inverter/charger circuit 220 is operative to act as an inverter when the AC source 10 has failed or become degraded, so as to generate an AC voltage to power the load 20 from an auxiliary power DC power source 230, e.g., a battery, coupled to the inverter/charger circuit 220 by a DC link 215. When the AC source 10 is in a normal state, the inverter/charger circuit 220 may act as a rectifier, supplying charging current to the auxiliary source 230 over the DC link 215.

U.S. Pat. No. 6,295,215 to Faria et al. describes a power supply apparatus that includes a multi-mode DC/AC converter circuit that provides a first component of power, for example, a real power component, while a bypass circuit provides a second component of power, for example, a harmonic power component and/or a reactive power component, to the load from an AC power source. The power supply apparatus may have another mode of operation in which the DC/AC converter circuit exclusively provides power to the output port.

SUMMARY OF THE INVENTION

According to some embodiments of the invention, an uninterruptible power supply apparatus includes a first bidirectional power converter circuit having first and second ports and a second bidirectional power converter circuit having first and second ports. The apparatus further includes a DC link that couples the second port of the first bidirectional power converter circuit to the first port of the second bidirectional power converter circuit. A first load port is coupled to the second port of the second bidirectional power converter circuit and a second load port is coupled to the first port of the first bidirectional power converter circuit. The apparatus further includes a control circuit configured to control the first and second bidirectional power converter circuits such that each of the first and second bidirectional power converter circuits is selectively operable to generate and/or condition AC power at each of the first and second load ports. For example, the control circuit may be configured to control the first and second bidirectional power converter circuits such that each of the first and second bidirectional power converter circuits is selectively operable to generate AC power at each of the first and second load ports from an auxiliary DC power source coupled to the DC link.

In further embodiments of the invention, the control circuit is operative to provide at least two of the following modes of operation: a first mode wherein the first bidirectional power converter circuit provides power conditioning at the second load port while the second bidirectional power converter circuit provides AC power at the first load port; a second mode wherein the first bidirectional power converter circuit generates AC power at the second load port from the auxiliary DC power source while the second bidirectional power converter circuit generates AC power at the first load port from the auxiliary DC power source; a third mode wherein the second bidirectional power converter circuit generates AC power at the first load port from the auxiliary DC power source while the first bidirectional power converter circuit is disabled; a fourth mode wherein the second bidirectional power converter circuit generates AC power at the second load port from the auxiliary DC power source while the first bidirectional power converter circuit is disabled; a fifth mode wherein the second bidirectional power converter circuit generates AC power at the first and second load ports from the auxiliary DC power source; a sixth mode wherein the first bidirectional AC power converter circuit generates AC power at the second load port from the auxiliary DC power source while the second bidirectional power converter circuit is disabled; a seventh mode wherein the first bidirectional AC power converter circuit generates AC power at the first and second load ports from the auxiliary DC power source; an eighth mode wherein the first and second bidirectional AC power converter circuits concurrently generate power at the first load port from the auxiliary DC power source; and a ninth mode wherein the first and second bidirectional AC power converter circuits concurrently generate power at the second load port from the auxiliary DC power source. The control circuit may be operative to selectively provide each of the first, second, third, fourth, fifth, sixth, seventh, eighth and ninth modes of operation.

In some embodiments, the control circuit includes a first switch operative to couple and decouple the first port of the first bidirectional power converter circuit to and from an AC power source and a second switch operative to couple and decouple the first port of the first bidirectional power converter circuit to and from the second port of the second bidirectional power converter circuit. The DC link may include first and second DC voltage busses, the first bidirectional power converter circuit may include a first half bridge circuit operative to selectively couple a first terminal of the first load port to the first and second DC voltage busses, and the second bidirectional power converter circuit may include a second half bridge circuit operative to selectively couple a first terminal of the second load port to the first and second DC voltage busses.

The control circuit may be configured to selectively operate the first bidirectional power converter circuit and/or the second bidirectional power converter circuit in a standby or line interactive manner. The control circuit may also be configured to selectively operate the first bidirectional power converter circuit and the second bidirectional power converter circuit to provide on-line uninterruptible power to the first load port. The control circuit may also be configured to selectively operate the first bidirectional power converter circuit and/or the second bidirectional power converter circuit to provide power conditioning at the first load port and/or the second load port. The control circuit may further be operative to bypass the first and second bidirectional power converter circuits to provide AC power at the first load port.

According to further aspects of the invention, related methods for operating an uninterruptible power supply apparatus may also be provided.

DETAILED DESCRIPTION OF EXEMPLARY EMBODIMENTS

Specific exemplary embodiments of the invention now will be described with reference to the accompanying drawings. This invention may, however, be embodied in many different forms and should not be construed as limited to the embodiments set forth herein; rather, these embodiments are provided so that this disclosure will be thorough and complete, and will fully convey the scope of the invention to those skilled in the art. In the drawings, like numbers refer to like elements. It will be understood that when an element is referred to as being "connected" or "coupled" to another element, it can be directly connected or coupled to the other element or intervening elements may be present.

FIGS. 3–13 are schematic diagrams illustrating exemplary apparatus and methods according to various embodiments of the present invention. The items in these figures, and combinations thereof, may be implemented using one or more electronic circuits, for example, power electronics circuits, such as half-bridge circuits and drive circuits therefor controlled by a processor, such as a microprocessor or microcontroller. It will also be appreciated that, in general, operations depicted in the diagrams, and combinations thereof, may be implemented in one or more electronic circuits, such as in one or more discrete electronic components, one or more integrated circuits (ICs), one or more application specific integrated circuits (ASICs), and application specific circuit modules, as well as by computer program instructions which may be executed by a computer or other data processing apparatus, such as a microprocessor or digital signal processor (DSP), to produce a machine such that the instructions which execute on the computer or other programmable data processing apparatus create electronic circuits or other means that implement the specified operations. The computer program instructions may also be executed on one or more computers or other data processing apparatus to cause a series of actions to be performed by the computer(s) or other programmable apparatus to produce a computer implemented process that includes the specified operations. Accordingly, the block diagrams support electronic circuits and other apparatus that perform the specified operations, and acts for performing the specified operations. It will be appreciated that the blocks may represent functional groupings of circuitry and that, even if separate functional blocks are illustrated, the same circuitry may be used in implementing the functions of the separate blocks.

Figure 3:
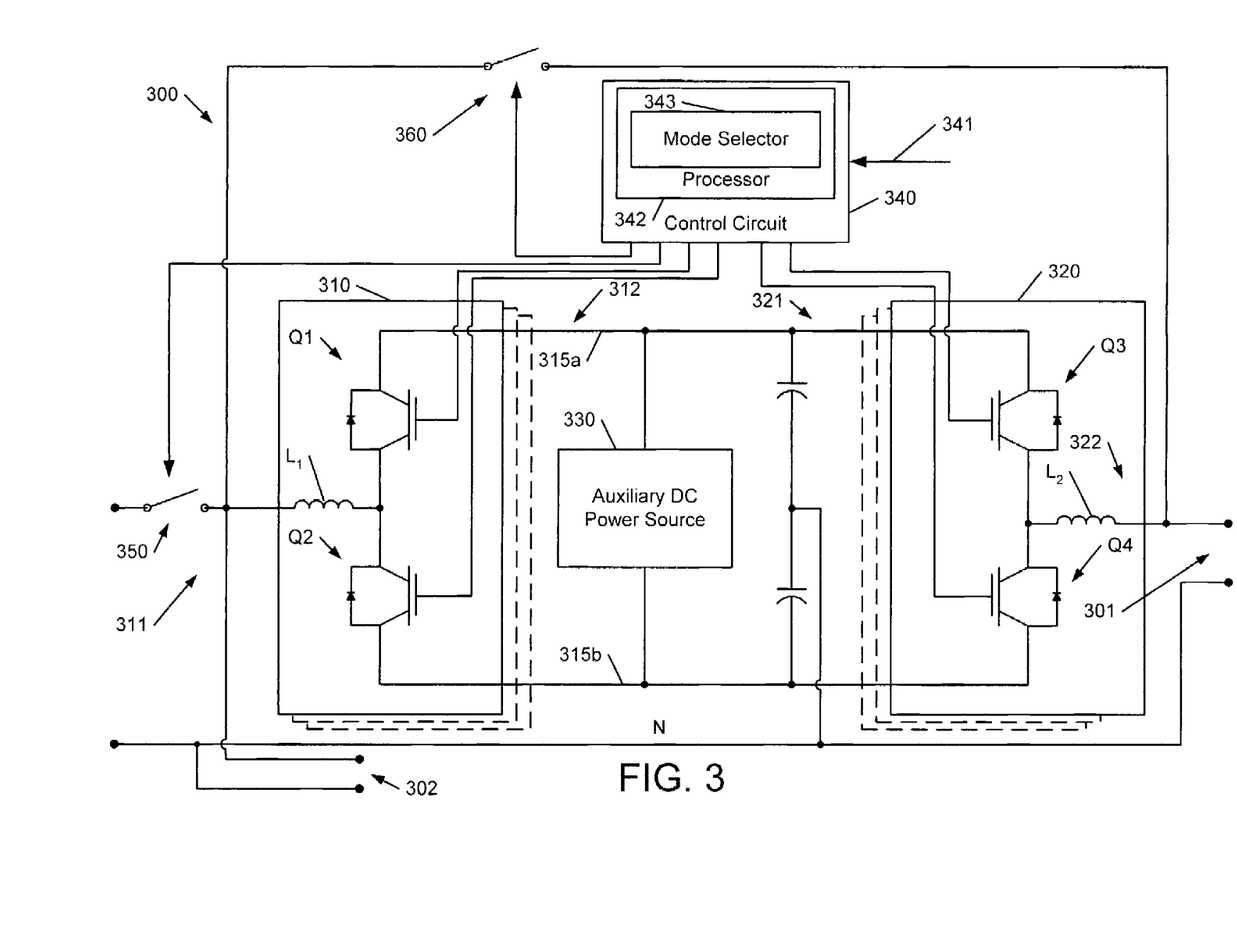
FIG. 3 is a schematic diagram illustrating a UPS apparatus according to some embodiments of the invention.

FIG. 3 illustrates a multi-mode double conversion UPS 300 according to some embodiments of the invention. The UPS 300 includes a first bidirectional power converter circuit including at least one half-bridge circuit 310, which includes switching transistors Q1, Q2 and an inductor L1, and which is controlled by a control circuit 340. It will be appreciated that, in polyphase embodiments, more than one such half-bridge circuit 310 may be present. The UPS 300 further includes a second bidirectional power converter circuit including at least one half bridge circuit 320 including switching transistors Q3, Q4 and an inductor L2, and also controlled by the control circuit 340. More than one of such half-bridge circuits 320 may be used in polyphase embodiments.

The UPS 300 also includes first and second switches 350, 360 (e.g., relays and/or solid state switches) that are also controlled by the control circuit 340. The first switch 350 is configured to couple and decouple an AC power source (e.g., an AC utility source) to and from a first port 311 of the first half-bridge circuit 310. A second port 312 of the first half-bridge circuit 310 is coupled to a DC link including first and second voltage busses 315a, 315b, which are also coupled to a first port 321 of the second half-bridge circuit 320. The second half-bridge circuit 320 also includes a second port 322 that is configured to be coupled to a load. The second switch 360 is configured to couple and decouple the first port 311 of the first half-bridge circuit 310 to the second port 322 of the second half-bridge circuit 320. The UPS 300 further includes an auxiliary DC power source 330 that is operative to provide DC power to the DC busses 315a, 315b. The auxiliary DC power source 330 may include, for example, a battery, fuel cell, or other source of DC power.

As shown, the control circuit 340 includes a processor 342 (e.g., a microcontroller, microprocessor or the like) in which a mode selector 343 is implemented. According to some embodiments of the invention, the mode selector 343 is responsive to a control input 341 to cause the control circuit 340 to control the half-bridge circuits 310, 320 and the switches 350, 360 to provide a variety of different operational modes. In particular, the control circuit 340 may be responsive to the control input 341 to operate the half-bridge circuits 310, 320 to provide various combinations of rectifier, inverter, and power conditioner operations, and to selectively couple the half-bridge circuits 310, 320 to first and second load ports 301, 302 to generate and/or condition AC power at the ports 301, 302 as shown, for example, in FIGS. 4–13.

Figure 4:
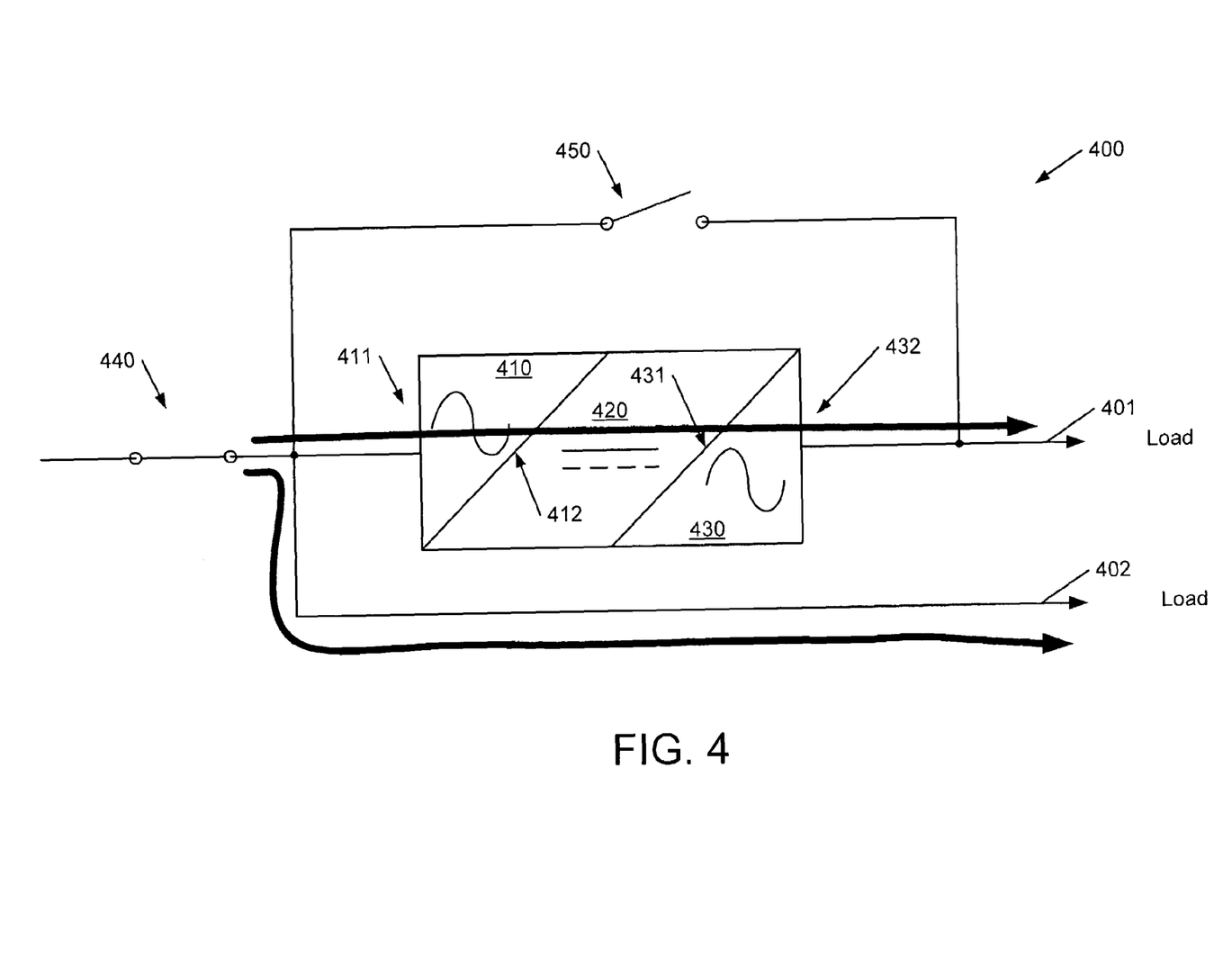
FIGS. 4–13 are schematic diagrams illustrating exemplary operations of UPS apparatus according to further embodiments of the invention.

In FIG. 4, a UPS 400 according to some embodiments of the invention includes first and second bidirectional power converter circuits 410 and 430 that are coupled by a DC link 420. The UPS 400 further includes a first switch 440 that is operative to couple and decouple a first port 411 of the first bidirectional power converter circuit 410 to a main AC source, e.g., a utility power source. A second port 412 of the first bidirectional power converter circuit 410 is coupled to the DC link 420, which is also coupled to a first port 431 of the second bidirectional power converter circuit 430. A second switch 450 is operative to couple and decouple the first port 411 of the first bidirectional power converter circuit 410 to and from a second port 432 of the second bidirectional power converter circuit 430. The second port 432 of the second bidirectional power converter circuit 430 is coupled to a first load port 401, and the first port 411 of the first bidirectional power converter circuit 410 is coupled to a second load port 402. For purposes of explanation of the operation illustrated in FIGS. 4–7, portions of the UPS 400, such as an auxiliary DC power source for providing DC power to the DC link 420 and control circuitry that controls the bidirectional power converter circuits 410, 430 and the switches 440, 450 (e.g., along the lines described above with reference to FIG. 3), are not explicitly illustrated, i.e., their function is subsumed into the functional items illustrated in FIG. 4.

Still referring to FIG. 4, in one mode of operation, the first switch 440 is closed and the second switch 450 is open. In this mode, the first and second bidirectional power converter circuits 410, 430 may be operated to provide an "on-line" UPS operation, i.e., the first bidirectional power converter circuit 410 may be operated as a rectifier to convert AC power from the main AC power source to DC to power the DC link 420 and the second bidirectional power converter circuit 430, acting as an inverter, converts DC power from the DC link 420 to AC to power a load coupled to the first load port 401. The first bidirectional power converter circuit 410 may also concurrently provide power conditioning (e.g., power factor correction and/or harmonic suppression) for a second load coupled to the load port 402. Techniques for providing such a combination of on-line operation and power conditioning in a double conversion UPS are described, for example, in U.S. patent application Ser. No. 10/286,027 to Taimela, filed Nov. 11, 2002, assigned to the assignee of the present application and incorporated herein by reference in its entirety.

Figure 5:
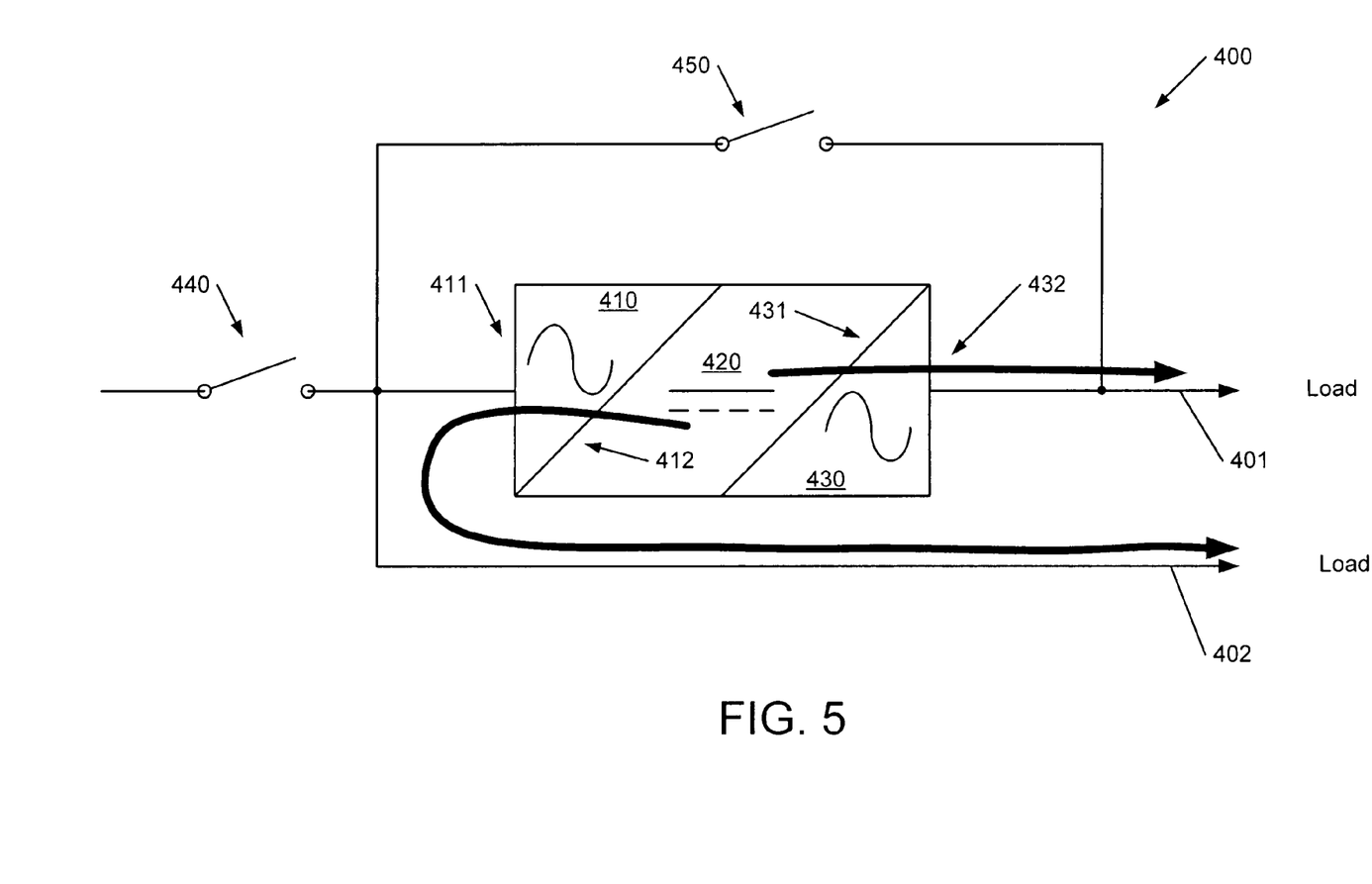

Referring now to FIG. 5, in another mode of operation when the main AC power source fails or is degraded, the first bidirectional power converter circuit 410 may be operated as an inverter to convert DC power supplied to the DC link 420 from an auxiliary DC power source to AC power to power the load coupled to the second load port 402. The second bidirectional power converter circuit 430 may similarly be operated as an inverter to provide AC power to a load coupled to the first load port 401. It will be appreciated that the first and second bidirectional power converter circuits 410, 430 may be operated in a standby and/or line interactive manner. In particular, as shown in FIG. 5, for standby operation, the first switch 440 may be opened upon failure of the main AC power source.

Figure 6:
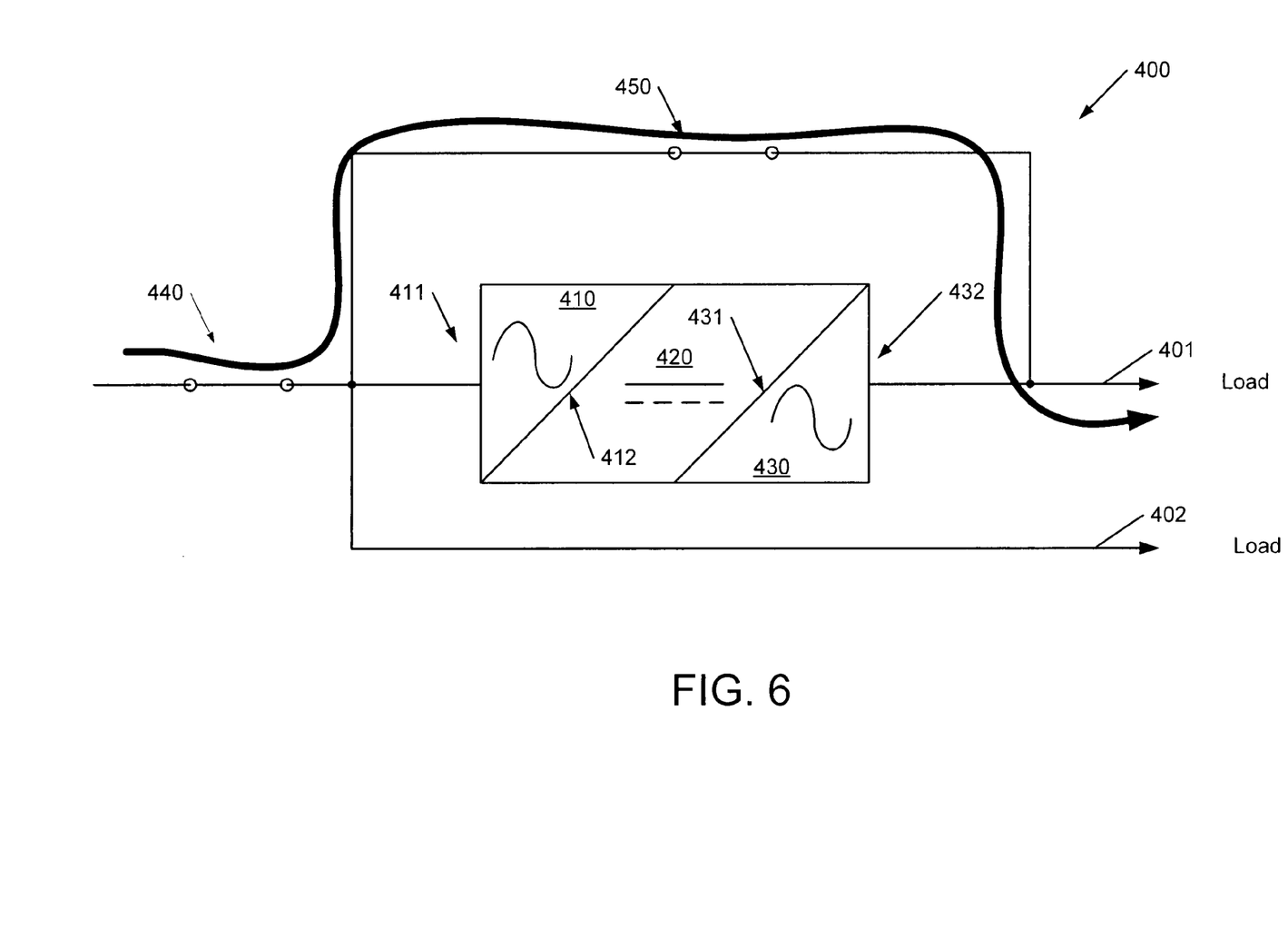
Figure 7:
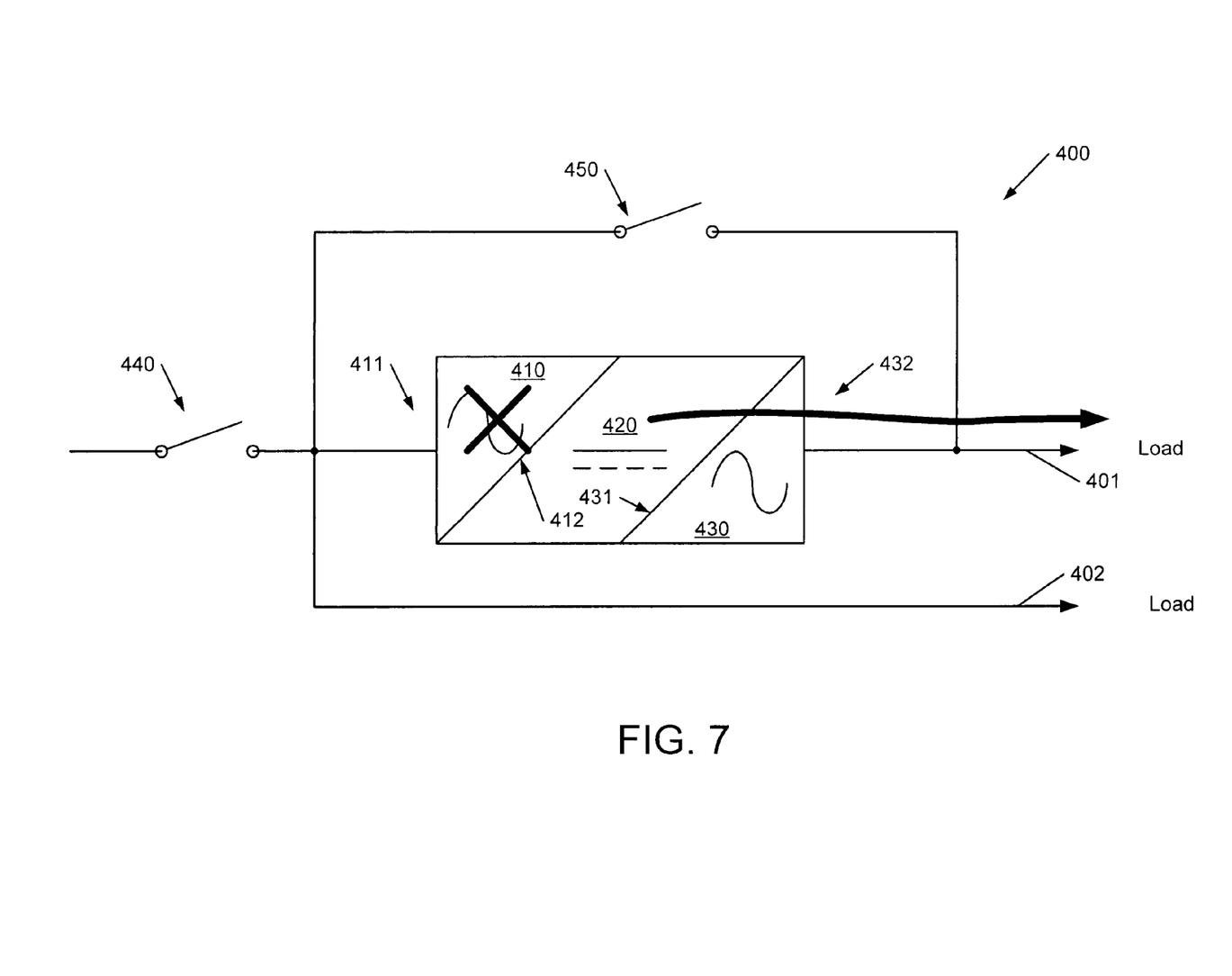
Figure 8:
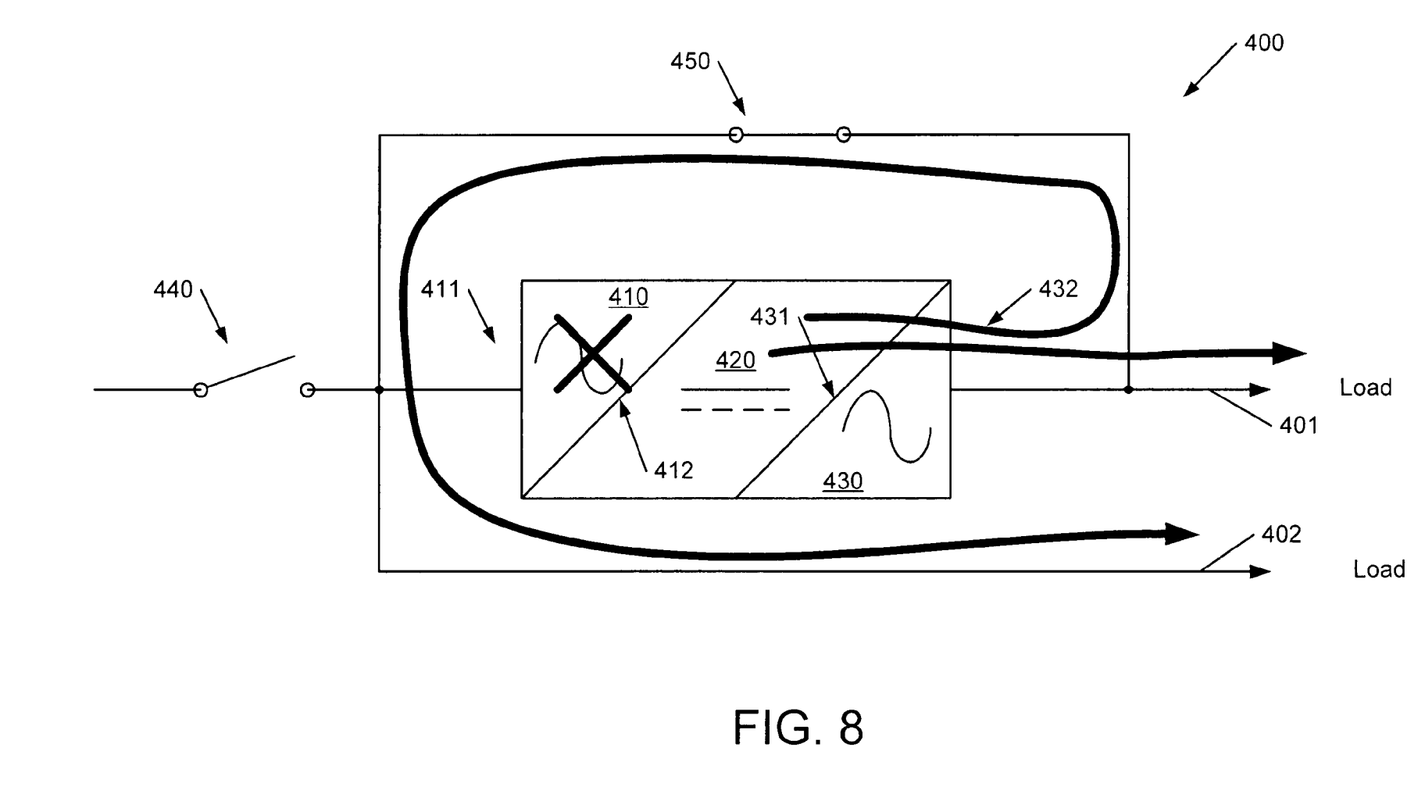
Figure 9:
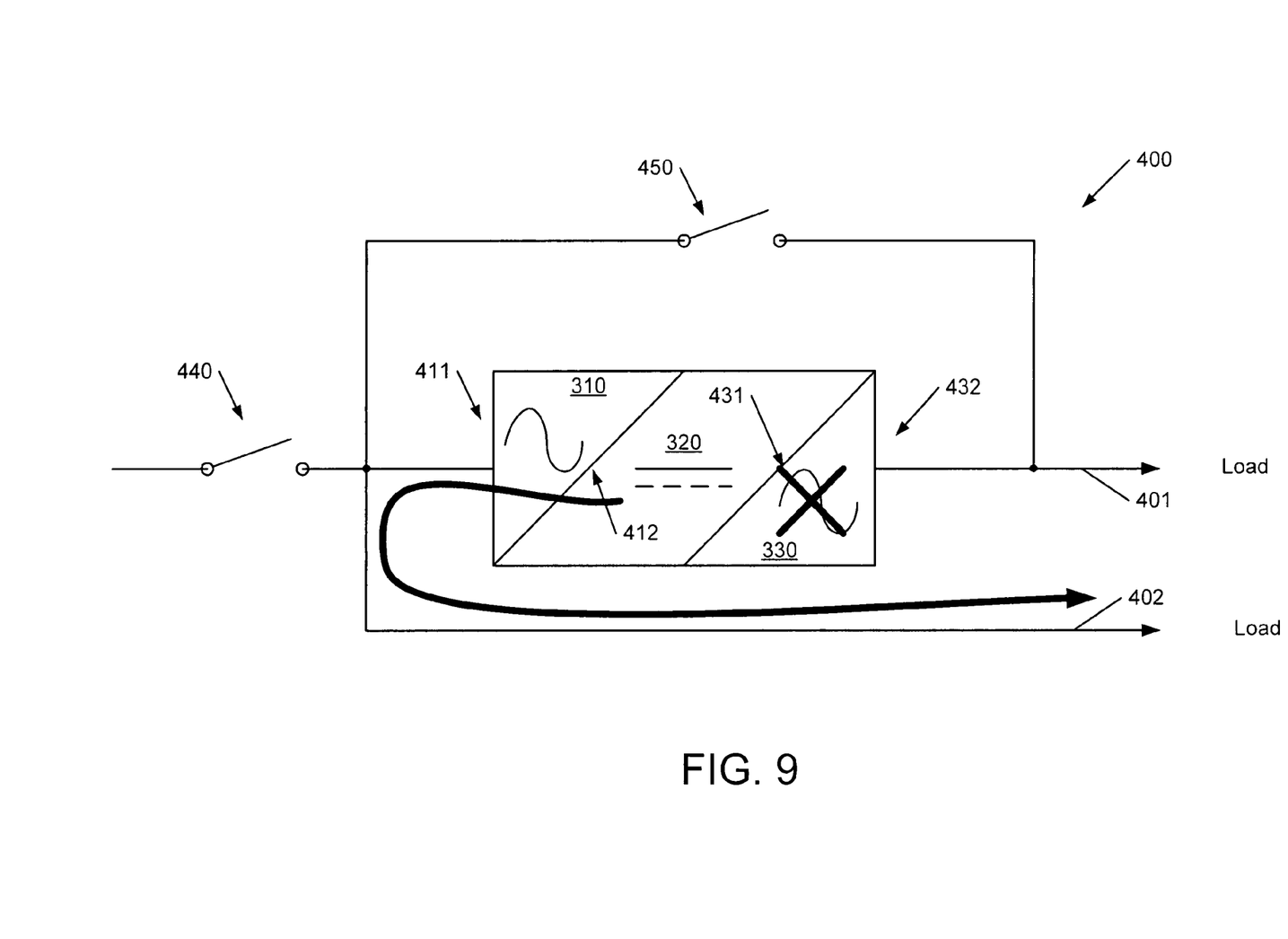
Figure 10:
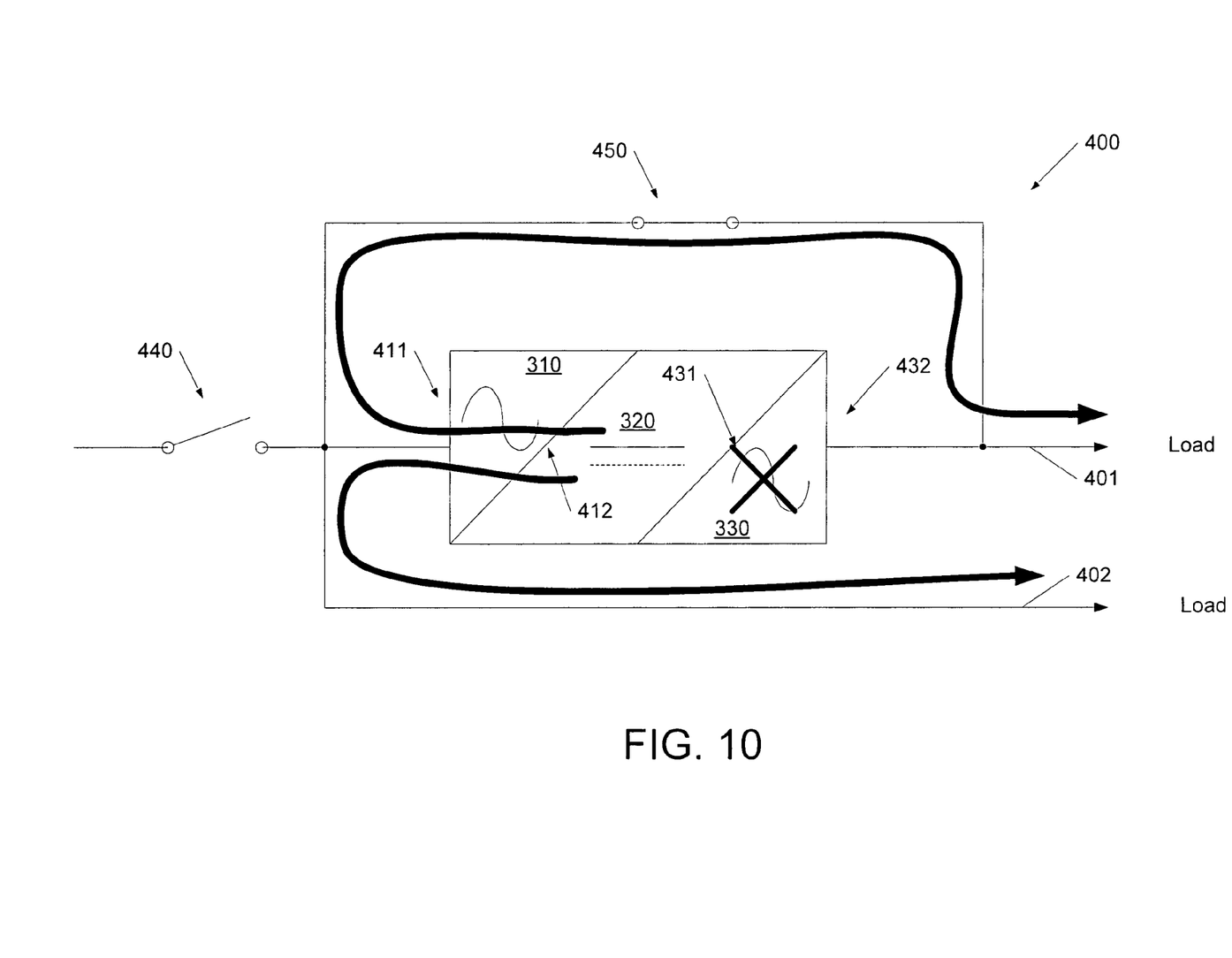
Figure 11:
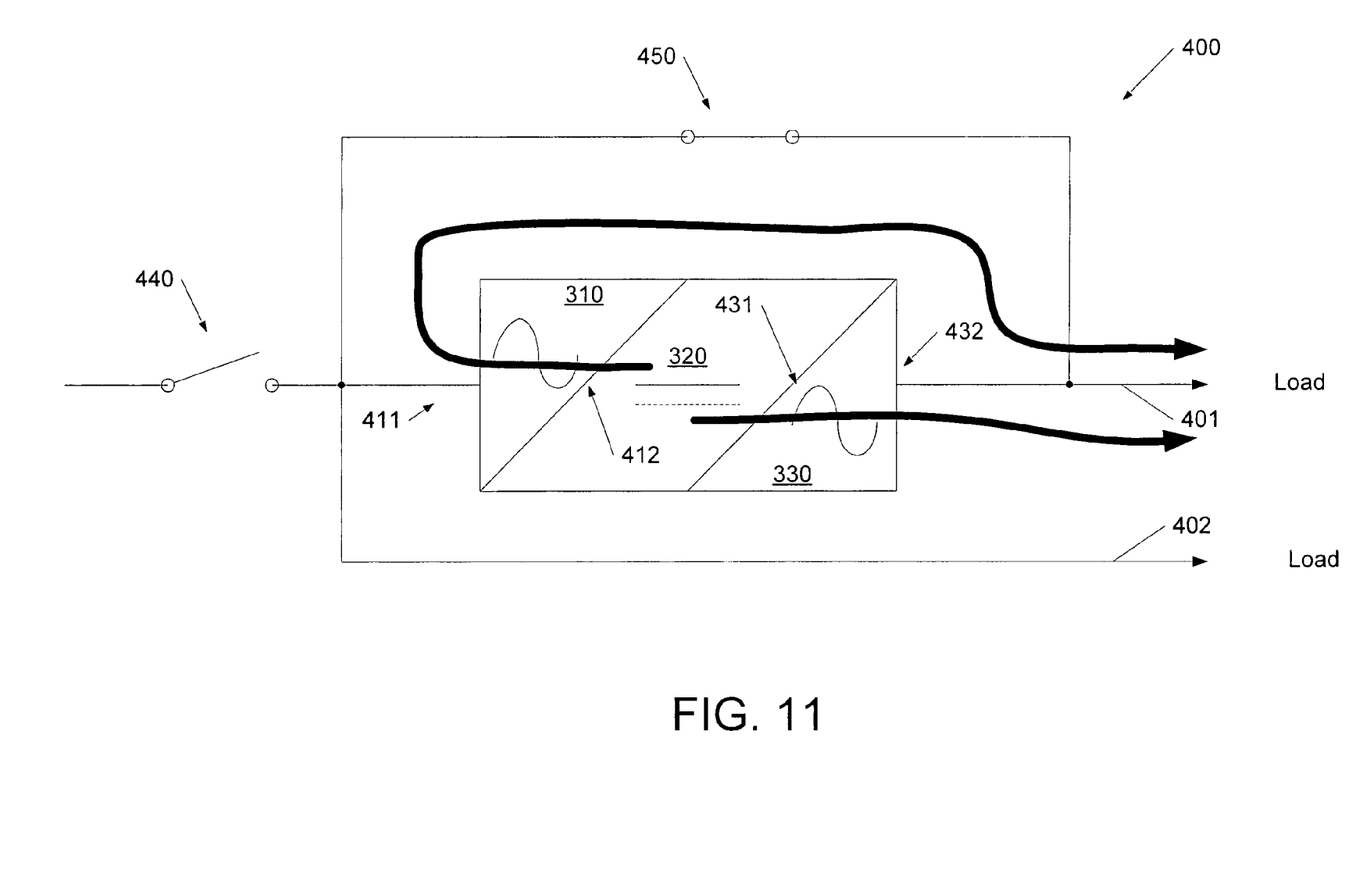
Figure 12:
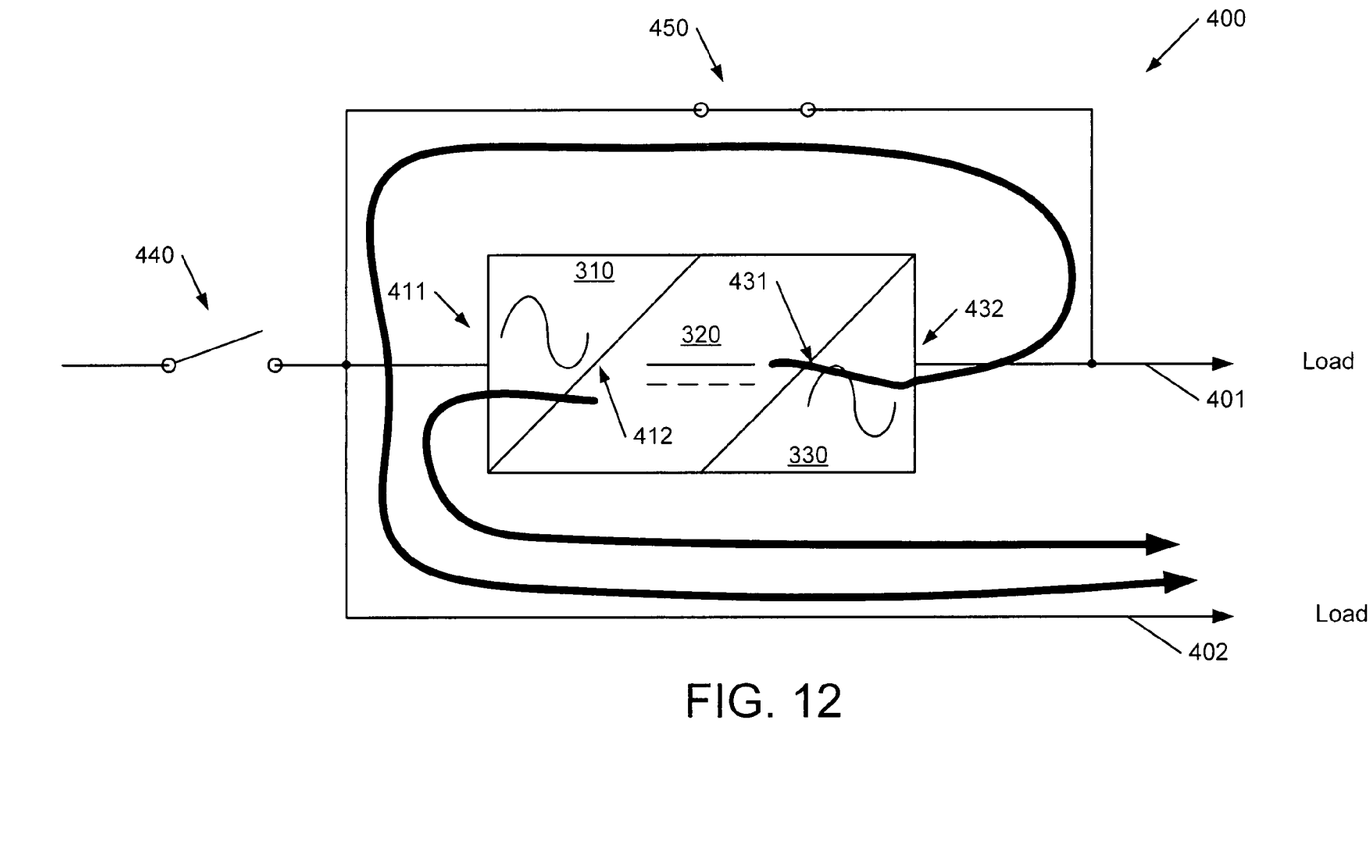
Figure 13:
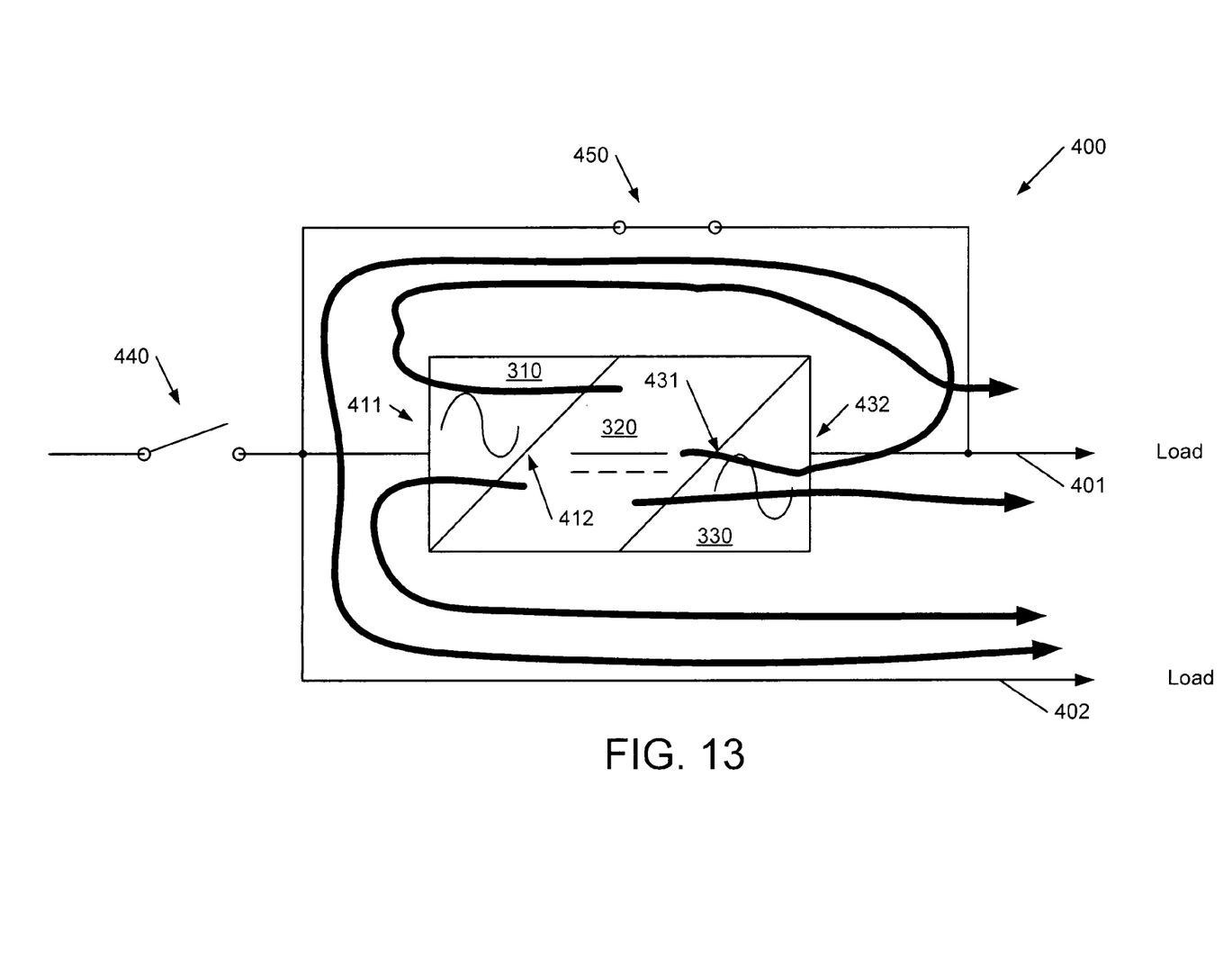

As shown in FIG. 6, the converter circuits 410, 430 may be bypassed by closing the first and second switches 440, 450. While in this bypassed mode, the second bidirectional power converter circuit 430 and/or the first bidirectional power converter circuit 410 may be used to provide power conditioning at the first load port 401 and/or the second load port 402. Referring to operational-modes illustrated in FIGS. 7 and 8, in the event of a loss of the main AC power source and a failure of the first bidirectional power converter circuit 410, the second bidirectional power converter circuit 430 may be operated as an inverter to provide AC power to the first load port 401 and/or the second load port 402 from an auxiliary DC power source feeding the DC link 420. As shown in FIGS. 9 and 10, in the event of loss of the main AC power source and failure of the second bidirectional power converter circuit 430, the first bidirectional power converter circuit 410 may be operated as an inverter to provide AC power to the first load port 401 and/or the second load port 402. As shown in FIGS. 11–13, the first and second bidirectional converter circuits 410, 430 may also be operated in parallel to provide power to the first load port 401 and/or the second load port 402 from the DC link 420.

In the drawings and specification, there have been disclosed exemplary embodiments of the invention. Although specific terms are employed, they are used in a generic and descriptive sense only and not for purposes of limitation, the scope of the invention being defined by the following claims.

The invention is claimed is:

1. An uninterruptible power supply apparatus, comprising:
    a first bidirectional power converter circuit having first and second ports;
    a second bidirectional power converter circuit having first and second ports;
    a DC link coupling the second port of the first bidirectional power converter circuit to the first port of the second bidirectional power converter circuit;
    a first load port coupled to the second port of the second bidirectional power converter circuit;
    a second load port coupled to the first port of the first bidirectional power converter circuit; and
    a control circuit configured to control the first and second bidirectional power converter circuits such that each of the first and second bidirectional power converter circuits is selectively operable to generate and/or condition AC power at each of the first and second load ports.

2. An apparatus according to claim 1, further comprising an auxiliary DC power source coupled to the DC link and operative to supply power thereto, and wherein the control circuit is configured to control the first and second bidirectional power converter circuits such that each of the first and second bidirectional power converter circuits is selectively operable to generate AC power at each of the first and second load ports from the auxiliary DC power source.

3. An apparatus according to claim 1, wherein the control circuit is operative to provide at least two of the following modes of operation:
    a first mode wherein the first bidirectional power converter circuit provides power conditioning at the second load port while the second bidirectional power converter circuit provides AC power at the first load port;
    a second mode wherein the first bidirectional power converter circuit generates AC power at the second load port from the auxiliary DC power source while the second bidirectional power converter circuit generates AC power at the first load port from the auxiliary DC power source;
    a third mode wherein the second bidirectional power converter circuit generates AC power at the first load port from the auxiliary DC power source while the first bidirectional power converter circuit is disabled;
    a fourth mode wherein the second bidirectional power converter circuit generates AC power at the second load port from the auxiliary DC power source while the first bidirectional power converter circuit is disabled;
    a fifth mode wherein the second bidirectional power converter circuit generates AC power at the first and second load ports from the auxiliary DC power source while the first bidirectional power converter circuit is disabled;
    a sixth mode wherein the first bidirectional AC power converter circuit generates AC power at the second load port from the auxiliary DC power source while the second bidirectional power converter circuit is disabled;
    a seventh mode wherein the first bidirectional AC power converter circuit generates AC power at the first and second load ports from the auxiliary DC power source;

an eighth mode wherein the first and second bidirectional AC power converter circuits concurrently generate power at the first load port from the auxiliary DC power source; and a ninth mode wherein the first and second bidirectional AC power converter circuits concurrently generate power at the second load port from the auxiliary DC power source.

4. An apparatus according to claim 3, wherein the control circuit is operative to selectively provide each of the first, second, third, fourth, fifth, sixth, seventh, eighth and ninth modes of operation.

5. An apparatus according to claim 3, wherein the power conditioning comprises at least one of power factor control and harmonic control.

6. An apparatus according to claim 1, wherein the control circuit comprises a first switch operative to couple and decouple the first port of the first bidirectional power converter circuit to and from an AC power source and a second switch operative to couple and decouple the first port of the first bidirectional power converter circuit to and from the second port of the second bidirectional power converter circuit.

7. An apparatus according to claim 1:
wherein the DC link comprises first and second DC voltage busses;
wherein the first bidirectional power converter circuit comprises a first half bridge circuit operative to selectively couple a first terminal of the first load port to the first and second DC voltage busses; and
wherein the second bidirectional power converter circuit comprises a second half bridge circuit operative to selectively couple a first terminal of the second load port to the first and second DC voltage busses.

8. An apparatus according to claim 7, wherein the first and second half bridge circuits comprise respective three-phase half bridge circuits.

9. An apparatus according to claim 1, wherein the control circuit is configured to selectively operate the first bidirectional power converter circuit and/or the second bidirectional power converter circuit in a standby or line interactive manner.

10. An apparatus according to claim 1, wherein the control circuit is configured to selectively operate the first bidirectional power converter circuit and the second bidirectional power converter circuit to provide on-line uninterruptible power to the first load port.

11. An apparatus according to claim 1, wherein the control circuit is configured to selectively operate the first bidirectional power converter circuit and/or the second bidirectional power converter circuit to provide power conditioning at the first load port and/or the second load port.

12. An apparatus according to claim 1, wherein the control circuit is operative to bypass the first and second bidirectional power converter circuits to provide AC power at the first load port.

13. A method of operating an uninterruptible power supply apparatus including a first bidirectional power converter circuit having first and second ports, a second bidirectional power converter circuit having first and second ports, a DC link coupling the second port of the first bidirectional power converter circuit to the first port of the second bidirectional power converter circuit, an auxiliary DC power source coupled to the DC link and operative to supply power thereto, a first load port coupled to the second port of the second bidirectional power converter circuit and a second load port coupled to the first port of the first bidirectional power converter circuit, the method comprising:
controlling the first and second bidirectional power converter circuits such that each of the first and second bidirectional power converter circuits is selectively operable to generate and/or condition AC power at each of the first and second load ports.

14. A method according to claim 13, wherein the uninterruptible power supply apparatus comprises an auxiliary DC power source coupled to the DC link and operative to supply power thereto, and wherein controlling the first and second bidirectional power converter circuits comprises controlling the first and second bidirectional power converter circuits such that each of the first and second bidirectional power converter circuits is selectively operable to generate AC power at each of the first and second load ports from the auxiliary DC power source.

15. A method according to claim 13, wherein the method comprises at least two of the following steps (a)–(i):
(a) operating the first bidirectional power converter circuit to provide power conditioning at the second load port while operating the second bidirectional power converter circuit to provide AC power at the first load port;
(b) operating the first bidirectional power converter circuit to generate AC power at the second load port from the auxiliary DC power source while operating the second bidirectional power converter circuit to generate AC power at the first load port from the auxiliary DC power source;
(c) operating the second bidirectional power converter circuit to generate AC power at the first load port from the auxiliary DC power source while the first bidirectional power converter circuit is disabled;
(d) operating the second bidirectional power converter circuit to generate AC power at the second load port from the auxiliary DC power source while the first bidirectional power converter circuit is disabled;
(e) operating the second bidirectional power converter circuit to concurrently generate AC power at the first and second load ports from the auxiliary DC power source;
(f) operating the first bidirectional AC power converter circuit to generate AC power at the second load port from the auxiliary DC power source while the second bidirectional power converter circuit is disabled;
(g) operating the first bidirectional AC power converter circuit to concurrently generate AC power at the first and second load ports from the auxiliary DC power source; (h) operating the first and second bidirectional AC power converter circuits concurrently to generate power at the first load port from the auxiliary DC power source; and
(i) operating the first and second bidirectional AC power converter circuits concurrently to generate power at the second load port from the auxiliary DC power source.

16. A method according to claim 15, including each of the steps (a)–(i).

17. A method according to claim 15, wherein the power conditioning comprises at least one of power factor control and harmonic control.

18. A method according to claim 13:
wherein the DC link comprises first and second DC voltage busses;
wherein the first bidirectional power converter circuit comprises a first half bridge circuit operative to selectively couple a first terminal of the first load port to the first and second DC voltage busses; and wherein the second bidirectional power converter circuit comprises a second half bridge circuit operative to selectively couple a first terminal of the second load port to the first and second DC voltage busses.

19. A method according to claim 18, wherein the first and second half bridge circuits comprise respect three-phase active bridge circuits.

20. A method according to claim 13, wherein the power conditioning comprises at least one of power factor control and harmonic control.

21. A method according to claim 13, wherein controlling the first and second bidirectional power converter circuits comprises operating the first bidirectional power converter circuit and/or the second bidirectional power converter circuit in a standby or line interactive manner.

22. A method according to claim 21, wherein controlling the first and second bidirectional power converter circuits comprises operating the first bidirectional power converter circuit and the second bidirectional power converter circuit to provide on-line uninterruptible power to the first load port.

23. A method according to claim 13, further comprising bypassing the first and second bidirectional power converter circuits to provide AC power at the first load port.

24. A method according to claim 13, further comprising operating the first bidirectional power converter circuit and/or the second bidirectional power converter circuit to provide power conditioning at the first load port and/or the second load port.

* * * * *